May 19, 1931. A. C. HARDY ET AL 1,806,197
METHOD OF AND APPARATUS FOR COMPARING AND RECORDING
RELATIVE INTENSITY OF RADIANT ENERGY
Filed June 1, 1927 2 Sheets-Sheet 1
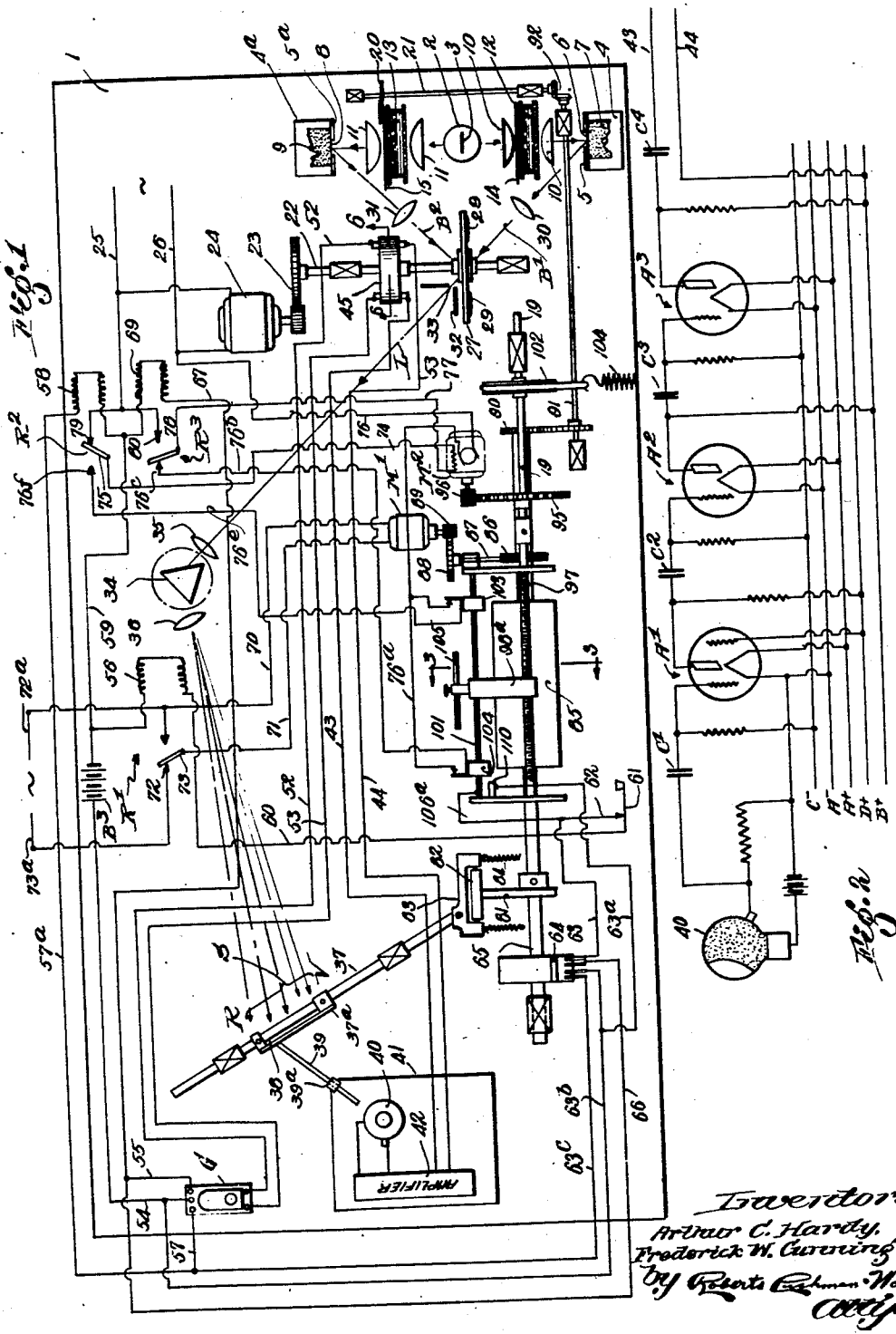

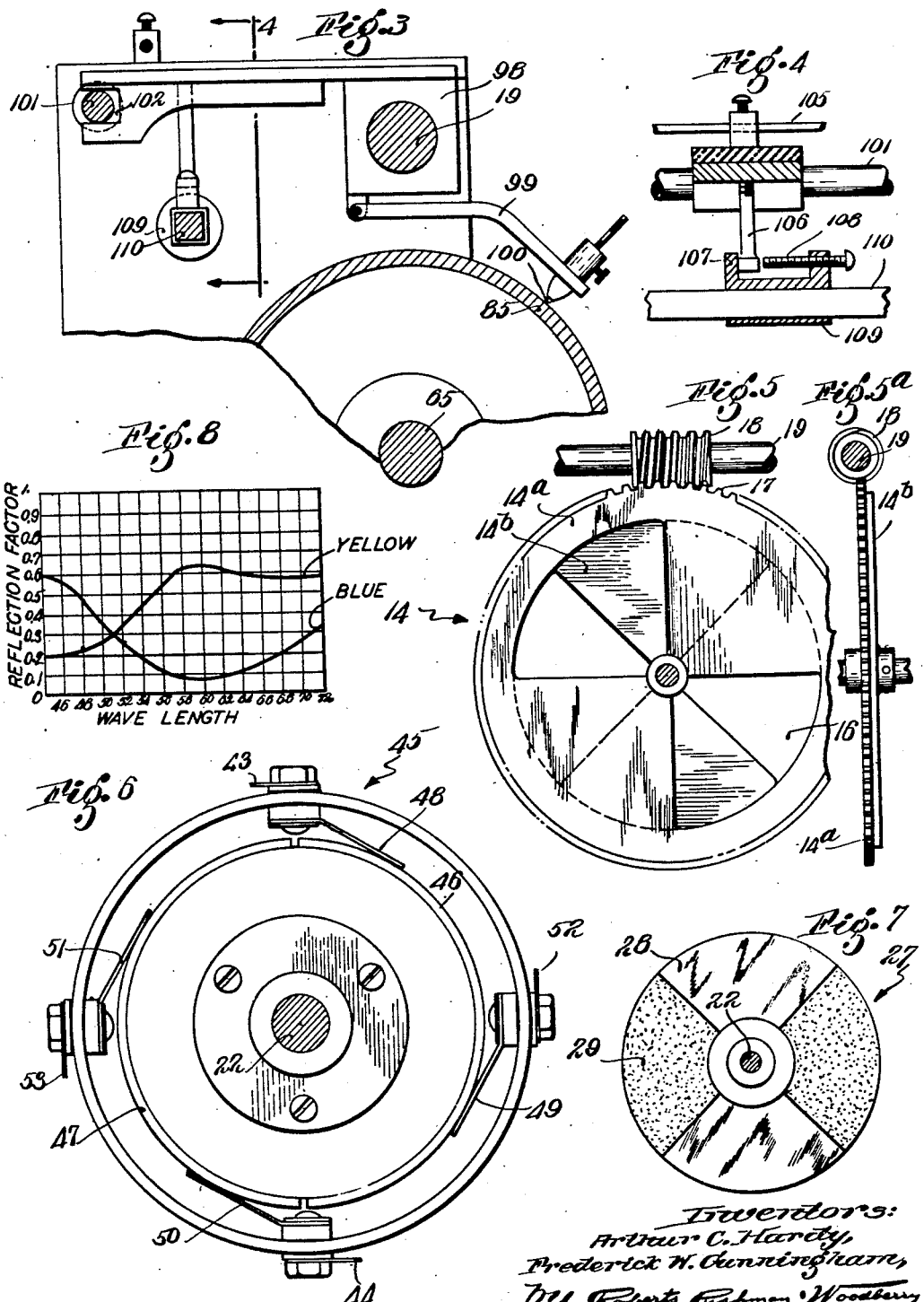

Patented May 19, 1931

1,806,197

UNITED STATES PATENT OFFICE

ARTHUR C. HARDY, OF WELLESLEY, MASSACHUSETTS, AND FREDERICK W. CUNNINGHAM, OF STAMFORD, CONNECTICUT, ASSIGNORS TO GENERAL ELECTRIC COMPANY, A CORPORATION OF NEW YORK

METHOD OF AND APPARATUS FOR COMPARING AND RECORDING RELATIVE INTENSITY OF RADIANT ENERGY

Application filed June 1, 1927. Serial No. 195,848.

This invention pertains to a method of comparing or measuring radiant energy (of which light, heat and electrical energy may be cited as examples) and for recording the results of such comparison or measurement, and to apparatus useful in the practice of such method, and in its more limited aspects relates to a method of and apparatus for comparing or measuring and recording radiant energy of wave lengths approximating those of light. Merely for convenience in description and as an illustrative example of one application of the broad principle underlying our invention we shall hereafter refer more particularly to its use in colorimetry, that is to say, the comparison of color samples with one another or with a standard of comparison and especially to the spectrophotometric analysis of a given color sample to determine the relative intensity, at any or all wave lengths, of the luminous radiations emanating from said sample, and for convenience in description the apparatus hereinafter referred to will be termed a "colorimeter".

Various methods of color comparison have heretofore been devised, but while there have been many suggestions in the prior art of methods of and devices for determining the specific color of a surface and of stating that specific color in terms such as definitely to identify the color referred to so that the arts and industries may be informed of the exact color, we are aware of no system of the sort of sufficient convenience, sufficient accuracy, and sufficient freedom from the requirement for skilled operation of the estimator of the color to reach the large field of utility waiting for some such system. Painters, whether industrial or artistic, confectioners, decorators, dyers, dressmakers, potters, enamelers, electroplaters, printers of wall paper, textile fabrics and colored illustrative or display books, pictures or posters; weavers and finishers of textile fabrics; the makers of pigments, paints, dyes and stains, as well as many others practicing industrial arts are dependent upon guesswork or ocular estimation of the color of materials or of surfaces, in the absence of any accurate system of nomenclature, means for accurate mensuration of the chromatic appearances, or other system of standards relating to color adapted to serve as the basis of communication from one artisan to another, and upon which the color of a surface can be accurately described. This is a considerable handicap in each of these arts.

Among the various methods employed for color comparison may be mentioned systems of color sample cards, the Maxwell color disk, and spectrophotometric measurements, but none of these prior methods fully meets commercial requirements, since in many arts the color determination, to be of any real value must be made quickly and often by persons who are not of the highest discernment or technical ability. Furthermore, in all of the systems heretofore known to us the idiosyncrasy of the individual observer must always be reckoned with as an indeterminate factor in the results of the observation, it being well recognized that the retina of the human eye differs with each individual in its response to any given wave length of light. Moreover, the human eye is subject to fatigue which renders its response to color vibrations even more uncertain, particularly when the eye is obliged to make a long series of comparisons, while the texture of the surface of color cards or similar means of comparison likewise affects the accuracy of the results of comparative observation. Further, the human eye observes but a small fraction of a sample surface at once, and as it is very seldom that a color sample is of absolutely uniform texture and color throughout its area the result of ocular observation may vary quite materially from the integrated color value of the entire surface of the sample. Even at best, the color card system, as ordinarily employed, and in the hands of a skilled observer furnishes but little assistance to the investigator desiring to know how to treat a given sample to make it match a selected standard. For example, in preparing dyestuffs for dyeing textile fabrics it is often a difficult matter to determine in what respect a dye sample fails to match a given standard, that is to say, whether it is necessary to add one color or another to the sample to make it match the standard and a mere comparison of the sample with a color card does not always indicate the remedy to be applied.

On the other hand, while the spectrophotometric method of determination is quite accurate (aside from the variable physiological error of the observer), it is very slow and laborious, since for accurate results it is often necessary to make several hundred individual observations which must then be plotted to indicate the result, and this method necessitates the employment of a skilled observer trained in the use of instruments of precision.

We have now discovered a method of comparing or measuring radiant energy in general and which we find particularly applicable to the comparison of the luminous energy of the spectrum and which is not affected by the color idiosyncrasy, fatigue or other physiological factors of the individual observer; which is applicable to the comparison of reflected, transmitted or emitted light; which permits rapid comparison of a sample with a standard for determination of color intensity at any or all wave lengths; which integrates the color of the entire exposed surface of the sample; which provides a record of the determinations; and which may be practiced by persons relatively unskilled in technical matters; and we have devised apparatus of simple and accurate character useful in the practice of this method.

Briefly stated, our method of comparison or measurement comprises the fundamental principle of causing radiant energy from two sources to be compared, whether one of such sources is a standard or not (the energy being directed by any suitable means such, for example, as reflectors, lens systems, etc.) to fall upon an electrical device which is highly sensitive to radiant energy of the kind to be compared or measured and through which device there flows an electrical current which is dependent in magnitude on the amount of energy which falls upon such device. In accordance with our method the energy from the two sources to be compared is caused alternately to fall upon a single sensitive electrical device, the rate of alternation being relatively rapid, for example, of the order of twenty cycles per second and thus, if the energy from the two sources to be compared is unequal, a pulsating current will be set up in the sensitive electrical device. This device may, for example, be a photoelectric cell, a bolometer, a radiometer or, in fact, any other device of the same general character in which current flow varies with the amount of radiant energy delivered to the device. Hereinafter, for convenience in description and illustration, we shall refer to this device as a photoelectric cell but do not intend to limit ourselves to this particular instrument, although for our purpose we find it eminently satisfactory.

In making the comparison between the energy from the two sources we cause the pulsating current in the photoelectric cell to make its presence known, either through a suitable observing instrument or preferably by means of an electrically actuated device adapted to operate mechanical parts— usually amplifying this pulsating current by suitable means, for example, thermionic tubes or the like, and preferably rectifying the pulsating current to permit its use for observational purposes or actuation of the desired mechanism. Having determined the existence of this pulsating current, either by means of an indicating instrument, as above noted, or mechanically, we proceed to vary the energy received from one of the sources until the energy from both sources, as received at the photoelectric cell is substantially equal, which may be determined by the fact that under such conditions the pulsations in the current through the cell cease, and the current becomes constant. If, as above stated, we employ amplifying means between the cell and the observing instrument or other mechanism responsive to such pulsating current, the amplification ceases when the current becomes steady, and thus the indicating instrument or other mechanism normally acting in response to the pulsating current ceases to function, thereby making it apparent that the energy received from each source is the same.

When our broad method, above described, is to be applied to colorimetry, we prefer to disperse beams of light on their way from each of the respective sources to the photoelectric cell so as to form extended alternating spectra, and we expose the cell progressively to the various parts of the spectral bands, for instance, at certain definite Fraunhofer lines beginning, for example, at the red end of the spectrum and progressing toward the violet end. At each point of exposure of the photoelectric cell to the spectrum, comparison is made of the intensities of the luminous radiations arriving from the respective sources, and this observation may be noted by reference to indicating instruments and recorded manually, such records afterward being plotted to form a color comparison curve, but preferably such a curve is formed mechanically and automatically by suitable mechanism under the control of the pulsating current in the photoelectric cell.

For comparing samples of pigment or other opaque colored samples, it is necessary to employ reflected light and as a standard of comparison we find that magnesium carbonate ($MgCO_3$) furnishes a uniformly pure white giving a very true and pure spectrum band. Preferably, we dispose the source of light between the standard, for example a block of magnesium carbonate, and the sample to be compared, and by the employment of suitable condensing lenses (if necessary interposing cooling cells in the light paths), we direct beams of light from the source of light onto the standard and onto the sample respectively. We then direct beams of reflected light from the standard and sample onto a suitable device adapted alternately to cut off the light from each source and to permit the light from each source intermittently to pass through a narrow slit, and thence to a dispersing prism, diffraction grating, or other instrument for producing an extended spectrum band. By alternately cutting off the light from the standard and from the sample we produce a flickering spectrum band which alternately represents the light from the standard and from the sample. We then expose the photoelectric cell or equivalent device to this band, preferably shielding the cell and providing, for example a narrow slit which permits light from but a small portion of the band to impinge upon the cell at any instant. We then move the slit lengthwise of the band and by the use of mirrors, by moving the cell or preferably by the use of a quartz rod or tube, cause the light from the slit always to fall upon the cell.

In dealing with reflected light from a sample and source, as above described, it is evident that the energy at the spectrum band, after dispersion of the reflected ray, may be exceedingly small and for this reason the sensitively responsive instrument, for example, the photoelectric cell, must be of such character that it will respond with great rapidity and with the utmost sensitiveness to minute variations in luminous energy falling thereon. It is also desirable that this sensitive instrument, whatever its nature, be responsive to light waves of any length throughout the spectrum. It is quite possible, if desired, to obtain a photoelectric cell which responds substantially uniformly to light of a wide range of wave lengths. For our purpose we find that a photoelectric cell is practical and gives results of sufficient accuracy. Due to the extreme sensitiveness of such a cell in which the current flow may be of the order of $10^{-10}$ amp. we find it necessary in some cases to protect this cell from stray electrical disturbances by enclosing it within a metal network or grid, and when so enclosed we find that the quartz tube or rod constitutes a very convenient instrument for admitting the light to the cell, since such rod may pass through a very small opening in the enclosing screen or grid without impairing the efficiency of the latter.

Since the current value in this cell is extremely small, it is obviously of little value for directly indicating conditions or directly controlling auxiliary apparatus and thus, as above described, we prefer to amplify this current, preferably using several stages of amplification of the general type employed in radio work. Preferably, we interpose condensers in this amplifying system and the amplified current is carried to a rectifying device which is driven synchronously with the means for alternately cutting off the light from the sample and standard. This rectifying device converts the amplified pulsating current into a flow in one direction or the other which actuates a suitable relay, for example, a direct current galvanometer, which in turn may actuate other relays controlling the current through a reversible electric motor, such motor actuating a shutter, diaphragm or other device for regulating the amount of light delivered from the illuminant to the sample, the standard, or both. For making an automatic record of the comparisons, we prefer to provide a stylus which is actuated by the same motor which operates the shutter, and we also provide a drum or other moving surface with which the stylus cooperates, the drum or moving surface being driven by a second motor at suitable speed and, if desired, carrying a sheet of paper or other material upon which the record is to be made. The drum motor also actuates mechanism for shifting the slit from one end of the spectrum to the other, and thus we provide continuously acting mechanism which automatically records the color intensity throughout the entire spectrum range as it compares the sample with the standard of comparison.

While we find that electric motors constitute convenient means for turning the drum and actuating the shutter and indicator or stylus, we comtemplate that other types of motor might be employed, for example fluid motors.

Various adjunctive features, useful for obtaining greater accuracy, for convenience in operation, and to insure against overrunning of the parts, will be hereinafter described more in detail in our specific description of apparatus constituting a preferred embodiment of our invention and by reference to the accompanying drawings in which we have illustrated our invention as embodied, for example, in an automatically recording colorimeter.

In the drawings:

Fig. 1 is a diagrammatic plan view, with certain parts broken away, illustrating the complete apparatus and showing the various electrical circuits;

Fig. 2 is an enlarged detail illustrating one arrangement of amplifier circuit useful in connection with the apparatus of Fig. 1;

Fig. 3 is a fragmentary vertical section, to large scale, substantially on the line 3—3 of Fig. 1;

Fig. 4 is a fragmentary vertical section on the line 4—4 of Fig. 3;

Fig. 5 is a fragmentary elevation showing the shutter device for controlling the intensity of illumination from the standard source;

Fig. 5$^a$ is an edge elevation of the device shown in Fig. 5;

Fig. 6 is a section substantially on the line 6—6 of Fig. 1, to larger scale, showing details of a current rectifying device;

Fig. 7 is a section, to larger scale, of the light-flashing disk; and

Fig. 8 is a diagram illustrating the type of record which is produced by the apparatus here disclosed.

Referring to the drawings, the numeral 1 designates a suitable base which is here shown as carrying the various elements of the apparatus, together with the wiring forming the electrical circuits. It is to be understood that the arrangement shown in Fig. 1 is merely illustrative and that various portions of the apparatus may be mounted upon separate supports and may, and preferably will in some instances, be widely separated.

Upon the base 1 we mount a light source 2, conveniently an incandescent lamp, preferably having a flat filament 3 which is disposed in the plane indicated in Fig. 1. At one side of the lamp 2 we provide a support 4 adapted to hold a sample to be tested or a standard of comparison. We have here illustrated this support 4 as holding the standard of comparison. This support is preferably provided with a shield 5 having an aperture through which the substantially flat surface 6 of the standard 7 is exposed to the light of the lamp 2. We find that for color comparisons a block of magnesium carbonate constitutes a very desirable standard as such a block reflects a very pure white light.

At the opposite side of the lamp 2 and conveniently at the same distance from the lamp as the support 4 we mount a second support 4$^a$, also provided with a shield 5$^a$ having a slit or aperture through which the flat surface 8 of the test sample 9 is exposed to the light from the lamp.

Between the lamp and the support 4 we preferably arrange a set of condensing lenses 10, and we also arrange a similar set of condensing lenses 11 between the lamp and the support 4$^a$. In order to avoid overheating the sample and the standard we preferably interpose at a suitable point between the lamp and each of the supports 4 and 4$^a$ cooling cells 12 and 13, respectively.

We also interpose between the lamp and the supports 4 and 4$^a$ a pair of shutter or diaphragm devices 14 and 15, respectively, adapted to cut off more or less of the light from the lamp and thus to determine the amount of light reflected from the exposed surfaces of the standard and sample, respectively.

Referring to Figs. 5 and 5$^a$, we have shown one form of shutter device 14 in detail, it being understood that the shutter device 15 may be of similar character. The shutter device 14 comprises a pair of plates 14$^a$ and 14$^b$, which may conveniently take the form of disks. Each of the plates 14$^a$ and 14$^b$ is preferably provided with alternating opaque and transparent quadrants. These quadrants may conveniently be formed by punching out the plates so as to leave openings such as 16 alternating with quadrants which are not punched out. By turning one of the plates relatively to the other it is evident that the open quadrants may be brought into registry, thus permitting a maximum amount of light to pass through the shutter device, while, on the other hand, by adjusting the plates properly the registering portions of the open quadrants may be diminished in area until, if desired, the opening is completely closed.

As shown in Fig. 5 the edge of the disk or plate 14$^a$ is provided with gear teeth 17 which mesh with a worm or pinion 18 on a shaft 19 which is mounted in suitable bearings carried by the support 1. The means for rotating this shaft is hereinafter more fully described.

The movable plate or disk of the shutter device 15 is preferably provided with an arm or other means contacting with a cam 20 mounted upon a shaft 21 which is rotated by means hereinafter more fully described. By suitably shaping the cam 20 the shutter device 15 may be adjusted in one direction or the other and at such varying speed as may be desired.

A shaft 22 is mounted to turn in suitable bearings carried by the base 1 and this shaft is arranged substantially parallel to the optical axes of the condensing lenses 10 and 11, that is to say, the shaft 22 is substantially perpendicular to the planes of the exposed faces 6 and 8 of the standard and the test sample, respectively. The shaft 22 is preferably provided with a gear 23 meshing with a pinion upon the shaft of an electric motor 24 which is connected by suitable lead wires to the mains 25 and 26.

The shaft 22 carries a flashing device 27 which comprises a disk, preferably of glass, having alternating transparent quadrants 28 and reflecting quadrants 29. The reflecting surfaces of the quadrant 29 are turned toward the light reflected from the test sample 9 and the plane of the disk is so located that it makes substantially equal angles with beams of light B$^1$ and B$^2$ reflected from the surfaces 6 and 8 of the standard 7 and sample 9, respectively. For properly directing these beams of light we preferably interpose lenses 30 and 31 in such beams. As indicated in Fig. 1, the beam $B^1$ of light reflected from the standard 7 passes through the lens 30 and through the transparent sectors 28 of the flasher disk 27 and through a narrow slit 33 in a shield 32 disposed adjacent to one face of the disk. On the other hand the beam $B^2$ reflected from the test sample 9 impinges upon the reflecting sectors 29 of the disk 27 and is reflected from these reflecting surfaces so that it passes along the same path L as the beam $B^1$ and through the slit 33. The revolution of the shaft 22 with its disk 27 thus causes light reflected from the standard 7 and from the test sample 9 to pass in alternate flashes through the slit 37 along the path L. These alternating flashes of light next pass through a lens 35 and into a prism 34 which disperses the light to form an extended spectrum. We preferably interpose a lens 36 in the path of the light emerging from the prism 34 and the light from this lens 36 forms an extended spectrum band S with the violet end at V and the red end at R.

In suitable bearings we mount a sliding bar 37. This bar 37 carries a shield $37^a$ provided with an aperture or slit 38. Preferably we secure one end of a quartz rod or tube 39 to the shield $37^a$ with the end of the rod or tube exposed at the aperture 38. This rod or tube 39 is mounted in a swiveling support $39^a$ so that it may swing in accordance with the movement of the sliding bar 37. The opposite end of this rod or tube 39 is directed toward the window of a photoelectric cell 40.

While we prefer to use a quartz rod or bar for directing the light from the aperture in to the window of the photoelectric cell we may employ a series of mirrors for this purpose or we may, if desired, mount the cell upon the rod 37 so that the cell will travel with the aperture 38. Moreover, while a photoelectric cell is a desirable instrument for our purpose, we contemplate that other devices having generally similar characteristics may be substituted therefor.

We preferably enclose the photoelectric cell 40 or equivalent device in a suitable shielding enclosure 41 which may consist of a frame covered with wire mesh or other arrangement adapted to protect the cell from fortuitous electrical disturbances.

Since the current in such a cell is extremely small, being, for example, of the order of $10^{-10}$ amp., such current is of little value either for observational purposes or for actuating any mechanical device, and accordingly we provide means for amplifying this current. As shown in Fig. 2 we have provided three stages $A^1$, $A^2$, $A^3$, of amplification, employing thermionic tubes or equivalent devices which may be of well-known character, connected in suitable circuits which may be varied according to conditions, such circuits forming no essential part of the present invention, although usually such circuits will include condensers $C^1$, $C^2$, $C^3$ and $C^4$, or means equivalent for the purpose.

The amplified current from the last stage of amplification is conducted through wires 43 and 44 to a rectifying device 45 mounted upon the shaft 22 so that it operates in synchronism with the flashing disk 27.

This rectifier preferably comprises a support carrying insulated conducting segments 46 and 47, which are engaged by brushes 48, 49, 50 and 51. The brushes 48 and 50 are connected to the wires 43 and 44, respectively, while the brushes 49 and 51 are connected by wires 52 and 53 to the terminals of a direct current galvanometer relay G. In accordance with the movement of the galvanometer contact a circuit is completed through wires 54 and 55 or through wires 54 and 57, respectively. The wire 54 is connected with a suitable source of current, for example, the battery $B^3$. The wire 57 is connected by a wire $57^a$ to one terminal of the magnet 58 of a relay device $R^2$. The other terminal of the magnet 58 is connected by a wire 59 to the battery $B^3$. The wire 59 is also connected to one terminal of the magnet 69 of a second relay $R^3$. The other terminal of the magnet 69 is connected by the wire 67 to the wire 55.

One terminal of the magnet 56 of a third relay $R^1$ is connected to the wire 59 and its other terminal is connected by wire 60 to one contact of a key switch 61. The other contact of the key switch is connected by the wires 62 and 63 to a circuit closer 64 comprising an insulating disk having a metal segment at one part in its periphery and which is mounted upon a shaft 65 supported in bearings upon the base 1. A wire 66 extends from this circuit closer to the wire 55. Wires $63^b$ and $63^c$ extend from the same circuit closer 64 on shaft 65 to the wires 54 and 57, respectively.

An electric motor $M^1$ is mounted on the base 1 and the terminals of this motor are connected by wires 70 and 71 to the relay device $R^1$. This relay device comprises a fixed terminal 72 and a movable contact member 73, the movable contact being under the control of the magnet 56. The relay $R^1$ controls the flow of current from supply wires $72^a$ and $73^a$ to the motor $M^1$.

A reversible electric motor $M^2$ is mounted upon the base 1 and the field of this motor is connected by a wire 74 to the movable contact 75 of the relay $R^2$. One fixed contact 79 of this relay is connected to the supply wire 25, which is also connected to one fixed contact 80 of the relay $R^3$. The other field terminal of the motor $M^2$ is connected by wire 77 to the movable contact 78 of the relay $R^3$. One terminal of the armature of motor $M^2$ is connected by a wire 76 to the supply main 26, while the other armature terminal is connected by a wire 76ᵃ to circuit breakers 103 and 104 hereafter described. A wire 76ᵇ connects the other fixed contact 76ᶜ of the relay R³ to the circuit breaker 104.

A wire 76ᵉ connects the fixed terminal 76ᶠ of relay R² to the circuit breaker 103.

The shaft 65, which carries the circuit closer 64, also carries a cam 81 which engages a cam follower roll 82 mounted upon a bracket 83 carried by the slide bar 37. Springs 84 hold the cam follower roll 82 in contact with the cam 81. Thus, as the shaft is rotated the bar 37 is caused to slide in its guideways moving the aperture 38 longitudinally of the spectrum band S and thus exposing the photoelectric cell 40 progressively to light of the varying wave length.

The shaft 65 also carries a drum 85 which may support a wax cylinder, a sheet of paper, or other surface adapted to receive a record. The shaft 65 is provided with a gear 86 meshing with a gear upon the shaft 87, which in turn carries a gear 88 meshing with a pinion 89 on the shaft of the motor M¹.

The shaft 65 also carries suitable drive means 90 for actuating a shaft 91 which in turn, by means of suitable gearing 92, turns the shaft 21 carrying the cam 20 which adjusts the shutter 15.

The shaft 19 which carries the means for adjusting shutter 14 is provided with a gear 95 meshing with a pinion 96 on the shaft of the motor M² and thus in accordance with the direction in which the motor M² turns the shaft 19 is turned in one direction or another, thus opening or closing the shutter 14.

The shaft 19 is provided with a screw-threaded portion 97 engaging a nut member 98 forming part of a reciprocating carriage 98ᵃ which supports a lever 99 overlying the surface of the drum 85 and carrying stylus 100 adapted to cooperate with the drum in producing a record. The reciprocating carriage is provided with a rearwardly extending portion having a slot 102 which receives a metallic guide rod 101 carried in insulating supports on the base member 1. The rod 101 preferably supports the circuit breakers 103 and 104, respectively, disposed adjacent to opposite ends of the drum. These circuit breaking devices are connected in circuit with the motor M² as above described. Each circuit breaking device comprises normally engaging contacts, one of which is movable and is disposed in the path of a rod 105 mounted upon the carriage, so that as the carriage approaches one end or the other of the drum, rod 105 will engage the corresponding circuit breaking device, and thus break the circuit through the motor M², so that overtravel of the carriage will be automatically prevented.

The carriage also supports a contact device 106 which is in conducting relation to rod 101 and which is disposed between a fixed contact 107 and an adjustable contact 108 mounted upon metallic slide block 109 carried by a bar 110 mounted in insulating supports on the base 1. The rod 101 is connected by a wire 106ᵃ with the wire 62 and the bar 110 carrying contacts 107 and 108 is connected by the wires 63ᵃ and 63ᵇ to the circuit of relay R¹ so that whenever the contact 106 engages one of the contacts 107 or 108 the magnet 56 is energized and the circuit of motor M¹ is broken. Thus, as the carriage moves in one direction or the other, bringing the member 106 into engagement with one of the contacts 107 or 108, the drum motor M¹ is stopped while the motor M² continues to operate in the endeavor to set shutter 14 so as to balance the light from the sample and standard. During this movement the stylus 100 moves along an element of the drum cylinder, while the slide block 109 is pushed along by the contact 106. The momentum of the moving parts is such that when balance has been attained and the circuit through motor M² has been broken the shutter is moved just a little beyond the balance point, thus causing a slight reversal sufficient to break the contact of member 106 with block 109. Motor M¹ now starts again, rotating the drum and positioning the aperture 38 at a new point in the spectrum and the operation of balancing is repeated.

In the operation of the device the standard 7, which, as above stated, is conveniently a block of magnesium carbonate having a smooth plane face 6, is mounted upon the support 4, and the sample to be tested is mounted upon the support 4ᵃ with its surface 8 exposed at the slit in the shield 5ᵃ. The lamp is now lighted and light from the lamp passes in opposite directions through the condensing elements 10 and 11 and illuminates the standard 7 and the sample 9. The light reflected from the surfaces 6 and 8 passes through the lenses 30 and 31 and by the rotation of the disk 27 is despatched in alternating flashes along the line L through the lens 35 to the prism 34. The prism disperses this light which passes through the lens 36 and forms the spectrum band S. It being assumed that the slide 37 is in the position indicated in Fig. 1 where the aperture 38 is exposed at the red end of the spectrum and that the shutters 14 and 15 are so adjusted that a greater amount of red light is reflected from the standard 7 than from the sample 9, the energy represented by the flashes from the standard will be greater at the red end of the spectrum than the energy from the flashes received from the sample. Thus the photoelectric cell 40 will be subject to alternating variations in energy so that a pulsating current will be set up in this cell. This current is amplified by passage through the amplifying circuit and after amplification passes to the rectifier 45 where it is rectified and thence passes to the galvanometer G. In accordance with the direction of the current in any instant the current flows either through the leads 54 and 55 or through the leads 54 and 57. Assuming that the current flows through the leads 54 and 57, the magnet of the relay R² will be energized, drawing the contact 75 over against the contact 79 and thus completing a circuit through the motor M² in a direction such as to turn the shaft 19 so as gradually to close the shutter 14. This operation continues until the shutter has cut off light from the standard 7 to such an extent that the red rays from the sandard are no stronger than those from the test sample 9. When this result has been reached the flashes of light received at the photoelectric cell will be of substantially equal intensity, whereupon the current in such cell becomes uniform and the amplifying circuit is ineffective. The galvanometer G thus moves to zero position, the magnet 58 is de-energized, and the circuit through the motor M² is broken, thus stopping the shaft 19 and the shutter 14.

As the beginning of the above sequence of operations started, the movable contact 73 of relay R¹ was in engagement with contact 72, thus completing the circuit through drum driving motor M¹. If for any reason the magnet 56 be energized at the start of the operation, thus holding the circuit open, it may be deenergized to close the motor circuit by actuation of key 61. As the rotation of the shaft 19 causes the reciprocating carriage 98ᵃ to move longitudinally of the drum, the stylus 100 immediately begins to make a record upon the drum and so long as the carriage continues to move the stylus continues to form such record lines on the drum.

In adjusting the shutter 14 to obtain equal energy from the standard and from the test sample, the momentum of the parts produces overtravel which results in a readjustment and a restarting of the motor M¹, thus actuating the cam 81 and moving the aperture 38 to a new point in the spectrum. At this point the energy may again be different as received from the standard and from the test sample. Thus, immediately the photoelectric cell may become operative either to re-energize the relay R² or in accordance with a different indication of the galvanometer to energize the relay R³. In the first case the motor M² may be set into operation in the same direction as previously, while in the latter case the motor M² turns in the carriage with the stylus 100 to move oppositely to its original direction. At the same time the shutter 14 is moved in the appropriate direction either to decrease or increase the amount of light reflected from the standard.

During the above operations the shutter 15 may be adjusted by the cam 20 so as to vary the light received from the test sample at a predeterminated rate (in accordance with the position of the aperture 38 with respect to the spectrum) to compensate for the vary ratio of reflection of the reflecting surfaces of the disk 27 at different parts of the spectrum.

If at any time the carriage should reach one end or the other of the drum, the circuit breaking device 105 will break the circuit at 103 or 104, respectively, through the motor M² so as to prevent the stylus from running off the end of the drum. Further, after each complete revolution of the shaft 65 the circuit closer 64 automatically closes circuits which cause relay R¹ to open circuit through motor M¹ and which cause whichever of the relays R² and R³ is then in operation to open the circuit through motor M², thus causing both motors to stop.

In Fig. 8 we have illustrated the general appearance of a record such as produced by our apparatus, showing the results of testing samples of yellow and blue tone, respectively.

While the above arrangement is desirable and useful we contemplate that various changes in the elements employed, as well as in their arrangement, may be made without departing from the spirit of the invention. Thus in place of electric motors we contemplate that fluid pressure motors may be employed under some circumstances and possibly to some advantage in that such motors would not have any tendency to interfere with the sensitive operation of the photoelectric cell. We also contemplate that the shutters 14 and 15 may be disposed in the reflected beams of light B¹ and B² instead of between the source of illumination and the standard and test sample and that either or both shutters may be actuated for balancing the light. We also contemplate that in place of the prism 34 other dispersing means, for example a grating, might be employed, and as above described we also contemplate the substitution of equivalent means for the photoelectric cell 40 and for the amplifying circuit herein described.

Broader claims than those following, on certain aspects of the invention are contained in the Hardy application Serial No. 274,448, filed May 2, 1928, and entitled "Method of and apparatus for comparing and recording radiant energy," while claims of more limited scope are contained in the Hardy and Cunningham application Serial No. 274,729, filed May 3, 1928, and entitled "Method of and apparatus for comparing radiant energy."

We claim:

1. That method of determining the color characteristics of a test sample which comprises as steps delivering beams of light from said sample and from a standard of comparison, dispersing said beams to form extended spectra, exposing a sensitively responsive device in which an electric current varies in accordance with the luminous energy received by said device alternately to a corresponding part of each spectrum, amplifying the current in said device, rectifying said amplified current by means synchronized with the alternations of exposure of the device to said spectra, and employing the rectified current to cause such exposures of said sensitive device successively to occur at different portions of the spectra.

2. That method of comparing radiant energy from different sources which comprises as steps alternately delivering flashes of energy from each source to a sensitively responsive device in which an electrical current varies in accordance with the radiant energy received by said device, amplifying the current from said device, rectifying the amplified current, and employing said rectified current in varying the energy received from one of said sources until the current in said sensitive device becomes substantially constant.

3. That method of determining the color characteristics of a test sample which comprises as steps illuminating the test sample and a standard of comparison to provide two sources of reflected light, alternately delivering reflected light from said respective sources to a sensitively responsive device in which an electrical current varies in accordance with the amount of luminous energy delivered to said device, amplifying said varying current, rectifying the amplified current, providing means for changing the amount of light delivered from one at least of said means, and employing said rectified current for causing said light changing means to act until the current in said sensitive device becomes substantially constant.

4. That method of determining the color characteristics of a test sample which comprises as steps delivering beams of light from said sample and from a standard of comparison, dispersing said beams to form extended spectra, exposing a sensitively responsive device in which an electric current fluctuates in accordance with variations in the luminous energy received by said device alternately to a corresponding part of each spectrum, and employing the current from said sensitively responsive device for controlling the variation of energy delivered from the standard until the current in said device substantially ceases to fluctuate.

5. That method of determining the color characteristics of light reflected from a test sample which comprises illuminating said sample and a standard of comparison, delivering reflected beams alternately and in rapid succession from the sample and standard respectively to dispersing means whereby alternately to form an extended spectrum of each reflected beam, exposing a photoelectric cell to a corresponding portion of each of the alternating spectra, employing the current in said cell in automatically varying the intensity of light from the standard.

6. That method of determining the color characteristics of a test sample which comprises as steps delivering beams of light from said sample and from a standard of comparison, dispersing said beams to form extended spectra, exposing a sensitively responsive device in which an electric current varies in accordance with the luminous energy received by said device alternately to a corresponding part of each spectrum, amplifying the current in said device, rectifying said amplified current by means synchronized with the alternations of exposure of the device to said spectra, and employing the rectified current for varying the luminous energy delivered from the standard and for recording such variation in energy.

7. That method of determining the color characteristics of a test sample which comprises as steps illuminating the test sample and a standard to provide sources of light, alternately delivering light from said sources to a sensitively responsive device in which an electrical current varies in accordance with the amount of luminous energy delivered to said device, amplifying said varying current, rectifying the amplified current, varying the amount of light delivered from one of said sources, providing means for recording the variation in light, and employing said rectified current in determining the actuation of said recording means.

8. That method of comparing radiant energy from different sources which comprises as steps alternately delivering flashes of energy from each source to a sensitively responsive device in which an electrical current varies in accordance with the radiant energy received by said device, amplifying the current through said device, rectifying the amplified current, providing means for varying the energy received from one of said means and for recording said variation, and employing said rectified current to determine actuation of said energy varying and recording means.

9. That method of determining the color characteristics of a test sample which comprises as steps delivering beams of light from said sample and from a standard of comparison, dispersing said beams to form extended spectra, exposing a sensitively responsive device in which an electric current varies in accordance with the luminous energy received by said device alternately to a corresponding part of said spectrum, amplifying the current in said device, rectifying said amplified current by means synchronized with the alternation of exposure of the device to said spectra, and employing the rectified current for controlling the actuation of means for varying the luminous energy delivered from the standard, to cause such exposure of the sensitive device successively to occur at different portions of the spectrum, and for recording the energy delivered from said source at each such part of exposure.

10. Apparatus for comparing radiant energy from different sources comprising a device in which the electrical current varies in accordance with radiant energy received by said device, means for alternately delivering flashes of energy from each of said sources to said device, means for amplifying the current from said device, means for rectifying the amplified current, and means responsive to said rectified current for varying the energy received from one of said sources until the current in said sensitive device becomes substantially constant.

11. Apparatus of the class described comprising a photoelectric cell, means for exposing said cell alternately to light of a selected wave length received from a test sample and a standard of comparison respectively, and means responsive to fluctuation of the current in said cell for varying the luminous energy delivered from the standard of comparison.

12. Apparatus for determining the color characteristics of light reflected from a test sample comprising a source of illumination, means for supporting the sample and a standard of comparison, means for directing light from the source of illumination onto the standard and the test sample respectively, means for dispersing light to form a spectrum, rotary means for alternately delivering flashes of reflected light from the test sample and standard respectively to the dispersing means, a photoelectric cell exposed to the spectra produced by the dispersing means, means for amplifying the current from said cell, means synchronized with the rotary flash producing means for rectifying the amplified current, and means controlled by said rectified current for adjusting the intensity of the flashes of light from the standard until the current in the photoelectric cell becomes substantially constant.

13. Colorimeter apparatus comprising means for alternately delivering light of a given wave length from a test sample and a standard respectively to a photoelectric cell, a shutter for determining the light delivered by said standard, a motor for actuating said shutter, and means responsive to the current in said cell for determining the actuation of said motor.

14. Apparatus of the class described comprising means for supporting a test sample and a standard of comparison, rotary means for producing alternating flashes of light from said sample and standard, a photoelectric cell responsive to said alternating flashes, means for amplifying the current in said cell, means synchronized with the rotary flash producing means for rectifying said current, means responsive to said rectified current for determining the amount of light delivered by the standard, and means for varying the light delivered from the sample.

15. Apparatus for comparing radiant energy from different sources comprising a sensitive device in which an electrical current varies in accordance with the radiant energy received by said device, said device receiving energy from the several sources successively, means for amplifying said current and for rectifying the amplified current, and means responsive to said rectified current for adjusting the energy delivered from one of said sources and for recording such adjustment.

16. A colorimeter comprising means for dispersing light from a test sample to form an extended spectrum, a substantially stationary photoelectric cell, automatically operating means moving lengthwise of the spectrum for progressively exposing the photoelectric cell to light waves of different lengths, and means responsive to fluctuations in current in the cell for varying the intensity of light from the sample.

17. A colorimeter comprising means for dispersing light from a test sample to form an extended spectrum, a photoelectric cell, and a quartz rod having one end always directed toward the cell, and having its opposite end movable longitudinally of the spectrum, and means for moving said latter end whereby progressively to transmit light from various portions of the spectrum to the cell.

18. A colorimeter apparatus comprising means for delivering light of a predetermined wave length in alternating flashes from a test sample and a standard white surface respectively to a photoelectric cell, a shutter for determining the amount of light reflected from said standard white surface, a reversible motor for actuating said shutter, a stylus also actuated by said motor, a rotary drum cooperating with said stylus for making a record, a motor for turning the drum, and means responsive to the current in the photoelectric cell for determining the direction of rotation of the shutter actuating motor.

19. A colorimeter apparatus comprising means for directing light in alternate flashes from a test sample and a standard of comparison respectively onto a photoelectric cell, a shutter for adjusting the amount of light delivered from said standard, a reversible motor for actuating the shutter, a stylus also actuated by said motor, a movable record surface cooperating with the stylus, means for moving said record surface and for synchronously varying the wave length of the light to which the photoelectric cell is at any instant exposed, and means responsive to the current in the cell for determining the direction of rotation of said motor.

20. A colorimeter apparatus comprising a photoelectric cell, means for delivering alternate flashes of light to said cell from a standard of comparison and a test sample respectively, a shutter for varying the amount of light delivered by the standard, a stylus, reversible motor means for determining the movement of the stylus and shutter, a rotary drum cooperating with the stylus, means for turning the drum, a cam turning with the drum, means actuated by the cam for determining the wave length of light to which the photoelectric cell is at any time exposed, and means responsive to the current in said cell for controlling the direction of movement of the shutter actuating motive means.

21. A colorimeter apparatus comprising a photoelectric cell, means for delivering light in alternating flashes from a test sample and a standard of comparison respectively to the cell, a shutter for varying the light delivered by the standard, means for reversibly moving the shutter and for moving the stylus in opposite directions in synchronism with the shutter, a rotary drum, motor means for turning the drum, and means moving in synchronism with the stylus for determining the actuation of the drum driving motor.

22. Apparatus for determining the color characteristics of a test sample comprising means for supporting a sample and a standard of comparison, means for illuminating the sample and standard, means for dispersing light to form a spectrum, a rotary disk having alternating sectors which are transparent and which are reflecting surfaces, means for delivering light from the standard and test sample in paths making substantially equal angles with opposite faces of the disk, means for rotating said disk whereby light from the standard and from the test sample is transmitted in alternating flashes to the dispersing device, a photoelectric cell exposed to the spectra produced by the dispersing device, means for amplifying the current from said cell, restifying means synchronized with the rotating disk for rectifying the amplified current, a galvanometer relay responsive to said rectified current, a shutter for determining the amount of light delivered from the standard, a reversible electric motor for moving said shutter, relay devices for determining the direction of movement of said motor, means connecting said relay devices to the galvanometer relay whereby the latter selectively determines actuation of said relays, an indicator device moving synchronously with the shutter actuating means, a rotary recording drum cooperating with said indicator device, means for turning the drum, means moving with the indicator device for determining operation of the drum moving means, means turning in synchronization with the drum for determining that portion of the spectrum to which the photoelectric cell shall be exposed, and means moving in synchronization with the drum for varying the amount of light delivered to the test sample to compensate for the variable reflection factor of the reflecting surface of the rotating disk at different wave lengths.

23. In the art of comparing radiant energy from different sources by means of a sensitive device, the method of alternately delivering flashes of energy from each source to the sensitively responsive device in which an electrical current varies in accordance with the radiant energy received by said device, amplifying the current from said device, and employing said amplified current in varying the energy received from one of said sources until the current in said sensitive device becomes substantially constant.

24. In the art of determining the color characteristics of a test sample by means of a sensitively responsive device and a standard of comparison, the method which comprises illuminating the test sample and the standard of comparison to provide two sources of reflected light, alternately delivering reflected light from said respective sources to the sensitively responsive device in which an electrical current varies in accordance with the amount of luminous energy delivered to said device, amplifying said varying current, changing the amount of light delivered from one at least of said sources, and employing said amplified current for causing said light changing means to act until the current in said sensitive device becomes substantially constant.

25. In the art of determining the color characteristics of a test sample which employs a sensitively responsive device and a standard of comparison, the method of delivering beams of light from said sample and from the standard of comparison, dispersing said beams to form extended spectra, exposing the sensitively responsive device in which an electric current varies in accordance with the luminous energy received by said device alternately to a corresponding part of said spectrum, amplifying the current in said device, and employing the amplified current for varying the luminous energy delivered from the standard to cause such exposure of the sensitive device successively to occur at different portions of the spectrum, and for recording the energy delivered from said source at each such part of exposure.

26. That method of color comparison which comprises as steps delivering flashes of light alternately and in rapid succession from two sources to dispersing means whereby alternately to form extended spectra corresponding respectively to the two sources, comparing the intensity of illumination at corresponding parts of said spectra, and causing differences in intensity at the point of comparison automatically to vary the relative intensity of the sources.

27. That method of color comparison which comprises as steps comparing the intensities of light of selected corresponding wave lengths from two sources, and causing difference in intensities at the selected point of comparison automatically to vary the relative intensities of the sources until the intensities at the selected wave lengths are equal.

28. In the art of comparing light intensities from two sources which employ a reversible motor and a photoelectric cell, the method of delivering alternate flashes of light from the two sources to the photoelectric cell, and determining the direction of rotation of a reversible motor in response to the phase of the cell current.

29. Apparatus for comparing radiant energy from different sources comprising a device in which the electrical current varies in accordance with radiant energy received by said device, means for alternately delivering flashes of energy from each of said sources to said device, means for amplifying the current from said device, and means responsive to said amplified current for varying the energy received from one of said sources until the current in said sensitive device becomes substantially constant.

30. Apparatus of the class described comprising a photo-electric cell, means for exposing said cell alternately to light received from two sources, respectively, means for amplifying the current from said photoelectric cell, and means controlled by said amplified current for varying the amount of light delivered from at least one of said sources.

31. Apparatus for comparing radiant energy from different sources comprising a sensitive device in which an electrical current varies in accordance with the radiant energy received by said device, means for amplifying said current and means responsive to said amplified current for adjusting the energy delivered from one of said sources and for recording such adjustment.

32. Apparatus of the class described comprising means for exposing a light sensitive cell alternately to light from two sources, and means responsive to fluctuation in current in said cell for varying the intensity of light from one of said sources.

33. Apparatus of the class described comprising means for exposing a light sensitive cell alternately to light of corresponding wave length from two sources, and means responsive to fluctuation in current in the cell for equalizing the intensity of light received by the cell from the respective sources.

34. Apparatus of the class described comprising a flicker photometer for comparing light from two sources, and automatic means responsive to unequality in the light compared for relatively varying the light from the two sources until equality in the light compared is established.

35. Apparatus of the class described having means for comparing the relative intensity of light from two sources, comprising a light sensitive element, and means controlled by such light sensitive element for automatically equalizing the intensity of light from the two sources.

36. Apparatus of the class described comprising means for comparing the relative intensity of light from two sources, a part which moves in one direction or the other in accordance with the preponderance in intensity of the light from one source or the other, respectively, and means controlled by said moving part for automatically varying the relative intensity of the light from the two sources.

37. Apparatus of the class described comprising means for comparing the relative intensity of light from two sources, a part which moves in one direction or the other in accordance with the preponderance in intensity of the light from one source or the other, respectively, and means controlled by said moving part for automatically balancing the intensity of lift from the two sources.

38. Apparatus of the class described comprising means for comparing the relative intensity of light from two sources, a part which moves in one direction or the other in accordance with the preponderance in intensity of the light from one source or the other, respectively, and means controlled by said moving part for automatically recording the relative intensity of light from the two sources.

39. Apparatus of the class described comprising means for comparing the relative intensity of light from two sources, a part which moves in one direction or the other in accordance with the preponderance in intensity of the light from one source or the other, respectively, and means controlled by said moving part for automatically balancing the intensity of light from the two sources and for recording the point of balance.

40. Photometer apparatus for comparing light intensity from two sources, said photometer comprising a part which is illuminated by light from the two sources, and automatic means, operatively responsive to the relative intensity of illumination of said part by the two sources, for equalizing the intensity of illumination of such part by the respective sources.

41. Apparatus for determining the color characteristics of a test sample comprising means for delivering flashes of light alternately from two sources, the light from one source encountering a reflecting surface, a shutter for varying the intensity of the light which is reflected, and rotary cam means for adjusting the shutter to compensate for the variable reflecting factor of the reflecting surface when reflecting light of different wave lengths.

42. Apparatus for determining the color characteristics of a test sample, comprising means for supporting a sample and a standard of comparison, means for illuminating the sample and standard, a rotary disk having alternating sectors which are transparent and which are reflecting surfaces respectively, means for delivering light from the standard and sample in paths making substantially equal angles with opposite faces of the disk, means for rotating the disk whereby light from the standard and from the sample is transmitted in alternating flashes, and means for varying the amount of light delivered from the test sample to compensate for the variable reflection factor of the reflecting surface of the rotating disk at different wave lengths.

43. Apparatus for determining the color characteristics of a test sample comprising means for supporting a sample and a standard of comparison, means for illuminating the sample and standard, means for dispersing light to form a spectrum, a rotary disk having alternating sectors which are transparent and which are reflecting surfaces, respectively, means for delivering light from the standard and test sample in paths making substantially equal angles with plane of the disk, means for rotating the disk whereby to transmit light from the standard and sample in alternating flashes to the dispersing device, a shutter for varying the amount of light delivered to the test sample, and cam means for actuating said shutter whereby to compensate for the variable reflection factor of the reflecting surface of the rotating disk at different parts of the spectrum.

44. Apparatus of the class described comprising a photoelectric cell, means for alternately flashing light from two sources upon the cell, a reversible motor, means operated by the motor for varying the intensity of one of said light sources, and means operating synchronously with the flash producing means for determining the direction of rotation of the reversible motor in response to the phase of the cell current.

45. Apparatus for comparing radiant energy from different sources comprising a device in which an electrical current varies in accordance with radiant energy received by said device, means for alternately delivering flashes of energy from each of said sources to said device, a reversible motor, means operated by the motor for varying the energy from one of said sources, and means for controlling the direction of motion of the motor in accordance with the phase of the current.

46. Apparatus for comparing light intensities from two sources comprising a photoelectric cell, means for exposing said cell alternately to light from said two sources respectively, a reversible motor, means operated by the motor for varying the amount of light delivered to said cell from one of said sources, and means for controlling the direction of motion of the motor in accordance with the phase of the cell current.

47. Apparatus comprising a photoelectric cell, means for alternately delivering light within a wave length range less than the visible spectrum from a test sample and a standard respectively to said cell, a reversible motor, and means for controlling the direction of motion of the motor in accordance with the phase of the cell current.

48. A colorimeter apparatus comprising a photoelectric cell, means for delivering light of a predetermined wave length in alternating flashes from a test sample and a standard respectively to said cell, means for determining the amount of light reflected from said standard, a reversible electric motor for actuating said latter means, and means operating synchronously with the flash producing means for determining the direction of rotation of the motor in response to the phase of the cell current.

Signed by us at Cambridge, Massachusetts this 18th day of May 1927.

ARTHUR C. HARDY.
FREDERICK W. CUNNINGHAM.